Figure 1:
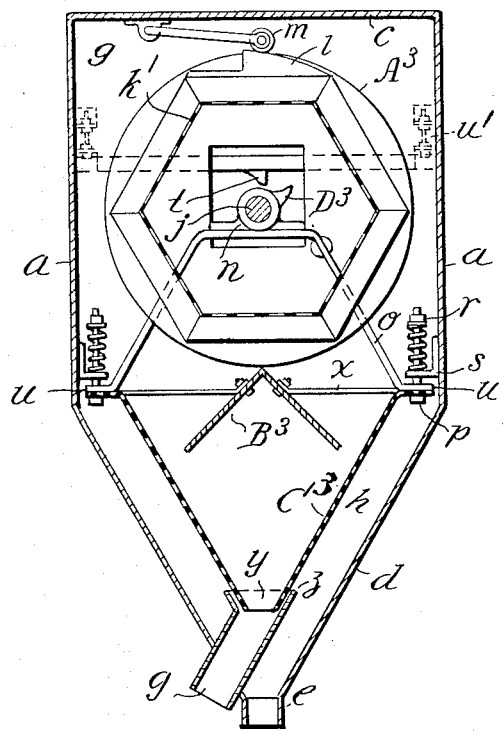

Jan. 14, 1936.　　　G. H. FRASER　　　2,027,375

SCREEN SEPARATOR

Filed Dec. 1, 1931

INVENTOR
George Holt Fraser

Patented Jan. 14, 1936

2,027,375

UNITED STATES PATENT OFFICE 2,027,375

SCREEN SEPARATOR

George Holt Fraser, Brooklyn, N. Y.

Application December 1, 1931, Serial No. 578,351

8 Claims. (Cl. 209—287)

This application is a continuation in part of my original application, Serial No. 26,033, filed April 27, 1925, which issued as Patent No. 1,834,095 on December 1, 1931.

This invention relates to screen separators for separating, grading, and collecting fine material, and aims to provide improvements therein.

Heretofore rotary screens, composed of cylindrical, conical, or longitudinally flared hexagonal screen frames have been mounted on a rotary and vertically movable or oscillatory slightly inclined or substantially horizontal axis within an enclosing casing and above an inclined hopper for receiving the fines passing through the screen clothing and segregating them from the oversize discharged as tailings from the large end of the screen. The material to be screened has entered at the small end and been progressed by gravity longitudinally through the screen, and the screen has been jarred by peripheral cams which have revolved with it under an overhead upwardly yieldable and downwardly movable impactive hammer for downwardly jarring the uppermost screen section to dislodge and drop back into the screen particles clinging in the meshes of the clothing, the tumbling of the material from one screen flight to the next being relied on to keep clean the meshes of the lower screen sections. For grading or classifying the products obtainable from such screens they have been provided with an initial screen clothing of fine mesh, and with successively coarser meshes of clothing to separately discharge the fineness desired, and with separate hoppers for receiving such fineness.

For further jarring them such rotary screens have been radially movable with upwardly spring pressed bearings vertically slidable in an axially or oscillatorily movable frame having a cam face below the screen shaft, and a rotary cam on such shaft is co-operable with such face to slowly vertically raise the screen and its shaft and bearings from the frame and then permit them to drop toward it, for arresting their descent with a downward jar to force material through the meshes of the screen clothing, which has endangered forcing oversize or wedge-shaped particles too tightly into the meshes to be dislodged therefrom by such overhead external peripheral jarrers.

My present invention aims to improve a cam jarred movable screen frame by rotatably mounting on it a self down movable rotary cam, and by providing on its support a vertically stationary cam plate above and co-operable with such cam for translating its upward stress into downward movement of the cam and the screen frame and for abruptly arresting upward movement of the latter parts for up-jarring these, and for supplementing the momentum of the screen frame with that of the cam, for accentuating such up-jarring, and my invention aims to so improve rotary screens that such up-jarring may be availed of for rotary screens by abruptly arresting their upward instead of their downward bodily movement, to dislodge oversize pieces from the meshes of their screen clothing instead of forcing such pieces into such meshes and to more effectively vibrate them and to simplify their construction for classification of two or more screened products, by equipping them with a self down movable rotary cam, and their support with a vertically stationary cam member above and co-operable with such cam for translating its stress into gradual downward movement of the cam and the screen frame, and for abruptly arresting upward movement of the latter parts for up-jarring these.

To this end in carrying out the preferred form of my present improvements as applied to a rotary screen which is bodily movable, preferably radially and axially, I preferably fix the screen itself on a rotary and axially movable shaft, rotatably mounted in vertically and axially movable bearing members having upwardly actant stop or abutment faces, and vertically and axially movably carried by a stationary support or main frame, having downwardly actant stop or abutment faces above and co-operable with said faces, for arresting upward movement of said parts, and I preferably provide movement accelerator up-presser means in operative relation to said bearing members, for up-pressing the latter at accelerating speed for causing abutment engagement of said stop faces, for upwardly arresting said movable bearing members and such shaft and the screen itself, and I preferably provide on the movable screen frame a self downwardly movable rotary drop cam, and on the screen support a vertically stationary cam plate, above and co-operable with such cam, for resisting its upward stress and translating such stress into gradual downward movement of the cam, for slowly bodily moving the screen and its shaft and bearing members in a downward direction and for then rendering said parts responsive to up-presser means for rapidly moving the screen and its shaft and bearing members at an accelerating speed in an upward direction and against such up-stop means for suddenly arresting the latter movement to impactively jar the screen, preferably so that the arresting movement will tend to inwardly lift the material being screen from the inner side of the screen clothing to dislodge wedge shaped pieces adhering in the meshes of the latter, and I preferably bodily axially move the screen itself and the shaft to which it is fixed and the bearing members for such shaft, which members are preferably provided with an axial abutment face co-operable with adjustable axial stops carried by the main frame and are axially pressed toward such stops by axially actant presser means, and I preferably provide means for slowly bodily moving the screen and its shaft and bearing members axially in one direction from said axial stop and for rapidly moving the screen and its shaft and bearing members at an accelerating speed in the other direction, and for suddenly arresting the latter movement to impactively jar the screen axially, preferably so that the arresting movement will facilitate travel longitudinally of the screen of the material being screened therein; and below the revolving screen or bolter I preferably provide a converged inclined tapering and preferably hopper shaped screen of finer mesh than the bolting screen for screening out an intermediate product and passing finer product into the usual fine hopper, which intermediate screen is preferably in the form of an inverted pyramid, and is movably and vibratorily suspended and vertically upwardly jarred to uplift from its meshes wedge shaped particles lodged therein and to facilitate downflow of coarser particles to its outlet, preferably by being swingingly hung on spring pressed bolts carrying movable frames on which the movable bearings of the rotary screen are mounted so that the rotary and inclined screens are moved and up-jarred simultaneously; and I preferably provide a divergent lateral conveyor or vibratory spreader below the rotary screen and above and inwardly of the inclined screen for receiving discharge from the rotary screen and dividing such discharge and diverting apportioned parts of it laterally on to the inclined screen, which spreader is preferably vibrated with the other screens for expediting flow of material over it, and I provide various other features of improvement, all of which will be hereinafter more fully set forth with reference to the accompanying drawing in which—

Figure 2:
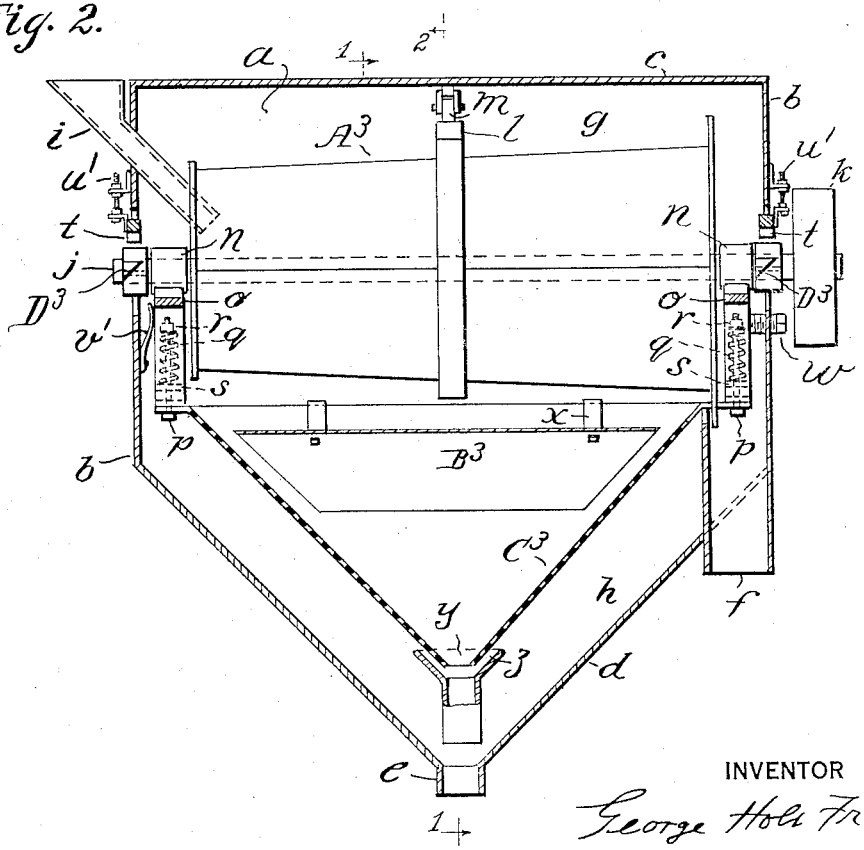

Fig. 1 is a vertical transverse section of a hexagonal revolving bolter embodying the preferred form of my present improvements, the view being cut approximately on the line 1—1 in Fig. 2 and looking in the direction of the arrow, and Fig. 2 is a longitudinal section thereof partly in elevation, the view being cut approximately on line 2 of Fig. 1 and looking in the direction of the arrow.

Referring to the drawing let $a$ indicate the side walls, $b$ the end walls, $c$ the top wall, $d$ the tapering hopper, $e$ the fine outlet, and $f$ the tailings outlet of any suitable support or frame or bolter casing enclosing a screening chamber $g$ and a fine chamber $h$. Let $A3$ indicate a rotary bolter within the chamber $g$, $i$ the feed spout for supplying material to its receiving end, $j$ the shaft carrying the bolter, and $k$ a belt pulley for revolving it.

These parts may be of any usual or suitable construction for receiving material to be screened from the spout $i$, dropping screenings into the hopper $h$ and discharging oversize as tailings into the spout $f$. The bolter $A3$ may be the usual hexagonal bolter comprising relatively coarse longitudinal sections of screen clothing $k'$, which are crossed intermediate of their extremities by one or more external peripheral cam castings $l$ which ride under a roller hammer $m$ hinged to the top wall $c$ for lifting the roller and letting it drop outwardly of the periphery of the bolter for downwardly jarring the top section. The bolter is slowly revolved and the material tumbles from one to another flight of screen clothing and gravitates down the inclined lower side of the bolter, which when its shaft is horizontal is sufficiently flared to give the desired inclination for progressing through it the material being screened.

According to one feature of this invention the self downwardly movable rotary screen which is preferably bodily movable as well as rotative relatively to the frame or casing, is provided with a self downwardly movable rotatable cam by which it is bodily moved slowly downwardly and is then moved with accelerating speed upwardly, and such upward movement is impactively arrested during revolution of the bolter. This is preferably accomplished by providing a similarly bodily movable shaft $j$ for the bolter, and by rotatively mounting the bolter shaft $j$ in similarly movable bearings $n$ mounted on similarly movable yokes $o$, the bolter and its shaft and bearings and yokes being preferably all similarly radially and axially movable together, and all being preferably swingingly upheld and uppressed by springs $q$, the tension of which is adjusted by adjustable nuts $r$, which movable yokes or frames $o$ are preferably movably carried from the side walls of the casing and have upwardly actant stop faces or abutments $u$ below downwardly actant stop faces or abutments on such walls, as the supports or brackets $s$, through which vertically and swingingly movable suspension members or bolts $p$ are vertically slidable to permit the bearings $n$ to be depressed by a force overcoming the tension of the springs and restore the bearings when such force ceases to act, so that the bearings are radially movable vertically and slightly swingingly movable horizontally and axially to yieldingly instead of rigidly sustain the bolter and its shaft, and by providing one or more preferably axially and downwardly actant presser means above the screen shaft, preferably as one or more non-rotary drop cam faces $t$ adjustably mounted on the end wall $b$ of the main frame and above and in cooperative relation to one or more upwardly and preferably axially actant rotary knocker cams $D3$ on the shaft of the revolving screen for bodily moving it against the tension of the spring $q$ and suddenly releasing it as the shaft revolves, as by acting against and upwardly toward the cam faces $t$ disposed in the path of revolution of the knockers $D3$ so that as the knockers engage the cams the bolter will be bodily depressed against the tension of the springs and as the knockers clear the cams the springs will be permitted to bodily lift the bolter until the abutment ends $u$ of the yokes $o$ strike the stop brackets $s$ which will suddenly arrest the upward movement of the bolter with an impactive jar tending to inwardly loosen particles adhering in the meshes of the lower sections of the screen clothing. The fixed cam $t$ is vertically stationary and above the cam $D3$, and is preferably adjustable as by adjusting screws $u'$ to vary its projection into the path of the cam $D3$ below it for varying the extent of depression of the bolter by the cam, to vary the jarring of the bolter, and is preferably adjusted relatively to the up-stops s so that when the abutment ends u of the yokes abut against these stops the face of the cam t will be above the hub of the cam D3 to permit free upward movement of the bolter and the upwardly movable parts until such upward movement is arrested by the stops s, and to avoid contact with the cam D3 except when the tappet of the latter is revolved into engageable relation with the cam t the cam face of both cams being preferably inclined to the desired extent to permit them to gradually and slowly depress the screen, and being mutually dropped abruptly from the maximum projections to completely clear each other as they disengage, to permit freedom for the action of the up-presser springs q as soon as the cams are disengaged.

Preferably the rotary cam D3 and the fixed cam t are slightly beveled to cause a slight axial movement of the bolter and its shaft j, and its bearings n and their movable bearing frame o and the cams D3 themselves, during each revolution so as to slowly move the bolter axially toward its receiving end against the tension of an axially acting spring v', which when the cams disengage will axially move the bolter in the direction of its discharging end until it is suddenly arrested by a stop screw w, for impactively jarring the bolter endwise and suddenly arresting its movement toward its discharging end to facilitate longitudinal progression through it of the material being screened.

Preferably the rotary cams D3 are fixed on the screen shaft j at the outer sides of the axially movable bearings n, and confine these bearings and their movable bearing frames between these cams, to protect the outer ends of such bearings and to axially position them and their frames relatively to the rotary cams during axial movement of the latter.

According to another feature of improvement the intermediate screen C3 under the bolter is preferably swingingly and movably mounted on the suspension bolts p and yieldingly sustained by the compression screws s so that it moves with the bolter bearings n and participates in their vibration so that the intermediate screen is upwardly jolted to clear its meshes and facilitate downflow of coarse material over it.

According to another feature of improvement I provide a reversely inclined spreader B3 between the bolter A3 and the intermediate screen C3, preferably loosely mounting the spreader on and within an upper part of the intermediate screen by carriers x so that it may participate in the vibrations of the bolter and intermediate screen to facilitate downflow of screenings falling on the spreader and divide these between the reversely inclined intermediate screens and to laterally convey such screenings on to an upper part of the latter.

According to another feature of improvement I preferably provide the intermediate screen with a contracted outlet y loosely and telescopically movably fitting the intermediate outlet spout z within the hopper h so that the intermediate screen may move vertically and laterally relative to its outlet spout.

In operation the vertically stationary cam member t above the rotary and self downwardly movable cam D3 will resist upward stress of the rotary cam and translate such stress into gradual self downward movement of the rotary cam and the shaft j and the screen frame o on which the shaft and cam are rotatably mounted and with which they are vertically movable, and the rotary cam will depress itself and such rotary parts in opposition to the tension of the up-presser means q until the tappet of the cam passes out from under that of the cam member t whereupon the self downwardly movable cam and the shaft and screen frame with which it is moved downwardly will be rendered responsive to the stress of the up-pressers, by which they will be up-pressed with accelerated speed until their upward movement is abruptly arrested by the cam member t or the stop abutments s and u, in which upward movement the weight and momentum of the upwardly moving self down movable rotary cam will supplement the weight and momentum of the screen frame, for accentuating the up-jarring incident to the abrupt arrest of these parts, by which accentuated up-jarring the material traversing the bolter will be uplifted out of its lower meshes by its abrupt upward jarring and progressed by its axial jarring as it travels from the inlet of the discharge end of the bolter, and the screened material will be spread on to the intermediate screen by the spreader B and progressed over this and down the intermediate screen by the jarring of these parts, and intermediate product will escape through the medium outlet z and fine product passing through the intermediate screen will descend in the hopper h to its outlet e, and the oversize scalped off within the bolter will escape through the tailings outlet F.

It will be seen that my invention provides improvements which may be variously and advantageously availed of, and it will be understood that the invention is not limited to the particular details of construction, arrangement, and combination of parts set forth as constituting its preferred form, since it can be employed in whole or in part according to such modifications as the judgment of those skilled in the art may dictate without departing from the spirit of the invention. Preferably the movable bearing frame o is approximately of inverted U-shape and its abutment ends u are extended downwardly below and outwardly of the sides of the bolter screen A3, to afford an upward clearance or space between them in which the baffle B3 may be disposed, to permit positioning the baffle adjacent the outer periphery of the screen clothing and in the upper part of the divergently inclined screens C3, and to dispose the abutments u and the stops s outwardly of the path of descent of the material being screened.

What I claim is:

1. In combination, a rotary bolter screen revolving about a substantially horizontal axis, a rotary shaft on which said screen is mounted, drive means for rotating said shaft, reversely inclined screens spaced below said rotary screen for receiving screenings therefrom, a vertically movable divergent spreader intermediate said inclined screens and below said rotary screen for dividing and spreading such material between said inclined screens, a frame on which said parts are mounted, and rotary cam means rotated by said drive means for vertically moving said spreader during revolution of said rotary screen for facilitating flow of such screened material from said spreader to said inclined screen.

2. A rotary screen, comprising in combination, a screen clothing, a frame for supporting said clothing, mounted for vertical movement to impart vertical movement to said clothing, a substantially horizontal shaft for supporting and rotating said screen, and up-presser means for pressing said screen upwardly; the combination therewith of self depression rotary cam means movable downwardly with, and rotatable with said screen, and adapted to move itself and said screen downwardly in opposition to said up-presser means, and a downward cam face opposite and above and co-operable with said rotary cam means, adapted during rotation thereof to cause the latter to depress itself and said screen collectively in opposition to said up-presser means.

3. A rotary screen, comprising in combination, a screen clothing, a frame for supporting said clothing, mounted for vertical movement to impart vertical movement to said clothing, a substantially horizontal shaft for supporting and rotating said screen, and up-presser means for pressing said frame upwardly; the combination therewith of self depression rotary drop cam means rotatable with said screen and movable downwardly with said frame, and adapted to move said frame downwardly in opposition to said up-presser means, and downward cam face means opposite and above and co-operable with said rotary cam means and adapted during rotation thereof to cause the latter to depress itself and said frame in opposition to said up-presser means and to then terminate said depression.

4. A rotary screen, comprising in combination, a screen clothing, a frame for supporting said clothing, mounted for vertical movement to impart vertical movement to said clothing, a substantially horizontal shaft for supporting and rotating said screen, and up-presser means for pressing said frame upwardly; the combination therewith of self depression rotary cam means rotatable with said screen and downwardly movable with said frame, and adapted to downwardly move the latter in opposition to said up-pressing means, and a downwardly extended under side drop cam face opposite and above and co-operable with said rotary cam means, adapted during rotation thereof to depress the latter and said frame in opposition to said up-presser means, and to then abruptly terminate said depression.

5. A rotary screen, comprising in combination, a screen clothing, a frame for supporting said clothing, mounted for vertical movement to impart vertical movement to said clothing, a substantially horizontal shaft for supporting and rotating said screen, and up-presser means for pressing said frame upwardly; the combination therewith of self depression rotary cam means rotatable with said screen and movable downwardly with said frame, and adapted to move the latter downwardly in opposition to said up-presser means, and an adjustable cam member having an under side cam face opposite and above and downwardly co-operable with said rotary cam means and adapted during rotation thereof to cause the latter to depress itself and said frame collectively in opposition to said up-presser means, for depressing said rotary cam means, said frame, and said clothing, collectively, in opposition to said up-presser means, and adjustable for varying said depression.

6. A rotary screen, comprising in combination, a substantially horizontal shaft on which said screen is mounted, bearing means on which said shaft is journaled, said bearing means being mounted for vertical movement to impart vertical movement to said screen, and up-presser means in operative relation to said bearing means for pressing said screen upwardly; the combination therewith of rotary cam means carried by said screen, and an under side cam face opposite and above and co-operable with said rotary cam means, and adapted during rotation of the latter to depress said screen in opposition to said up-presser means.

7. A rotary bolting screen, comprising in combination, a substantially horizontal shaft for supporting and rotating said screen, a frame in which said shaft is journaled, said frame being mounted for vertical movement to impart vertical movement to the screen, up-presser means for vertically pressing said frame upwardly, and up-stop abutment means for said screen; the combination therewith of rotary cam means carried by said rotary screen and adapted to move said screen downwardly in opposition to said up-presser means, and cam means opposite and above and co-operable with said rotary cam means and adapted during rotation thereof to cause the latter to depress said rotary screen in opposition to said up-presser means.

8. A rotary bolting screen, comprising in combination, a substantially horizontal shaft for supporting and rotating said screen, bearing means on which said shaft is journaled, said bearing means being mounted for vertical movement to impart vertical movement to said screen, up-presser means in operative relation to said bearing means for vertically pressing said screen upwardly, and rotary cam means in operative relation to said bearing means and adapted to depress the latter in opposition to said up-presser means, and to terminate said depression; the combination therewith of downwardly and inwardly converged screen means opposite and below said rotary screen, for receiving material screened therethrough and further screening said material, carried by said bearing means and vertically moved thereby with vertical movement of said rotary screen.

GEORGE HOLT FRASER.